United States Patent
Song et al.

(10) Patent No.: US 11,316,570 B2
(45) Date of Patent: Apr. 26, 2022

(54) APPARATUSES AND METHODS FOR NON-LINEAR PRECODING

(71) Applicant: Nokia Technologies Oy, Espoo (FI)

(72) Inventors: Nuan Song, Shanghai (CN); Eugene Visotsky, Buffalo Grove, IL (US); Huan Sun, Shanghai (CN); Fred Vook, Schaumburg, IL (US); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 128 days.

(21) Appl. No.: 16/955,405

(22) PCT Filed: Feb. 9, 2018

(86) PCT No.: PCT/CN2018/075961
§ 371 (c)(1),
(2) Date: Jun. 18, 2020

(87) PCT Pub. No.: WO2019/153235
PCT Pub. Date: Aug. 15, 2019

(65) Prior Publication Data
US 2021/0075483 A1    Mar. 11, 2021

(51) Int. Cl.
*H04B 7/0456* (2017.01)
*H04B 7/06* (2006.01)
*H04L 5/00* (2006.01)

(52) U.S. Cl.
CPC ......... *H04B 7/0617* (2013.01); *H04B 7/0456* (2013.01); *H04B 7/0626* (2013.01); *H04L 5/0051* (2013.01)

(58) Field of Classification Search
CPC .. H04B 7/0456; H04B 7/0617; H04B 7/0626; H04L 5/0051
See application file for complete search history.

(56) References Cited

U.S. PATENT DOCUMENTS

2008/0181285 A1    7/2008  Hwang et al.

FOREIGN PATENT DOCUMENTS

| CN | 103166688 A | 6/2013 |
|---|---|---|
| CN | 103312432 A | 9/2013 |
| CN | 108418614 A | 8/2018 |

(Continued)

OTHER PUBLICATIONS

Extended European Search Report received for corresponding European Patent Application No. 18905705.2, dated Oct. 8, 2021, 10 pages.

(Continued)

*Primary Examiner* — Brian P Cox
(74) *Attorney, Agent, or Firm* — Nokia Technologies Oy (57) ABSTRACT

Systems, methods, apparatuses, and computer program products for non-linear precoding in radio access networks are provided. One method may include, when it is determined that a user equipment is capable of being non-linearly precoded, determining one of two non-linear precoding modes and indicating the determined non-linear precoding mode to the user equipment. One of the two non-linear precoding modes is configured to use explicit beamformed channel state information, and the other one of the two non-linear precoding modes is configured to use explicit full downlink channel state information.

18 Claims, 5 Drawing Sheets

(56) References Cited

FOREIGN PATENT DOCUMENTS

| EP | 2747325 A1 * | 6/2014 | ........... H04B 7/0456 |
|---|---|---|---|
| EP | 2747325 A1 | 6/2014 | |
| EP | 2904711 A1 | 8/2015 | |
| WO | 2014/054043 A1 | 4/2014 | |

OTHER PUBLICATIONS

"Motivation for new Study Item on Multi Antenna Enhancements for NR", 3GPP TSG RAN Meeting #76, RP-171171, Agenda : 9.1, Nokia, Jun. 6-8, 2017, pp. 1-18.
Lin et al., "Block diagonal geometric mean decomposition (BD-GMD) for MIMO broadcast channels", IEEE Transactions on Wireless Communications, vol. 7, No. 7, Jul. 2008, pp. 2778-2789.
Abaii et al., "Test Scenarios and Calibration Cases Issue 2", IST-4-027756 Winner II, D6.13.7 v1.00, Dec. 31, 2006, pp. 1-57.
International Search Report and Written Opinion received for corresponding Patent Cooperation Treaty Application No. PCT/CN2018/075961, dated Jul. 13, 2018, 10 pages.
"Discussion on Non-linear Precoding Scheme for NR", 3GPP TSG RAN WG1 Meeting #87, R1-1700594, Agenda : 5.1.2.1, NTT DOCOMO, Jan. 16-20, 2017, pp. 1-4.

* cited by examiner

APPARATUSES AND METHODS FOR NON-LINEAR PRECODING

RELATED APPLICATION

This application was originally filed as PCT Application No. PCT/CN2018/075961 on Feb. 9, 2018, each of which is incorporated herein by reference in its entirety.

FIELD

Some example embodiments may generally relate to mobile or wireless telecommunication systems. For instance, various example embodiments may relate to non-linear precoding procedures in such telecommunication systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method, which may include determining one of two non-linear precoding modes for at least one user equipment that is capable of being non-linearly precoded, and indicating the determined non-linear precoding mode to the at least one user equipment. A first of the two non-linear precoding modes is configured to use explicit beamformed channel state information, and a second of the two non-linear precoding modes is configured to use explicit full downlink channel state information.

Another embodiment may be directed to an apparatus that may include at least one processor and at least one memory comprising computer program code. The at least one memory and computer program code configured, with the at least one processor, to cause the apparatus at least to determine one of two non-linear precoding modes for at least one user equipment that is capable of being non-linearly precoded, and to indicate the determined non-linear precoding mode to the at least one user equipment. A first of the two non-linear precoding modes is configured to use explicit beamformed channel state information, and a second of the two non-linear precoding modes is configured to use explicit full downlink channel state information.

Another embodiment is directed to an apparatus that may include determining means for determining one of two non-linear precoding modes for at least one user equipment that is capable of being non-linearly precoded, and indicating means for indicating the determined non-linear precoding mode to the at least one user equipment. A first of the two non-linear precoding modes is configured to use explicit beamformed channel state information, and a second of the two non-linear precoding modes is configured to use explicit full downlink channel state information.

Another embodiment is directed to a non-transitory computer readable medium comprising program instructions stored thereon for performing the steps of determining one of two non-linear precoding modes for at least one user equipment that is capable of being non-linearly precoded, and indicating the determined non-linear precoding mode to the at least one user equipment. A first of the two non-linear precoding modes is configured to use explicit beamformed channel state information, and a second of the two non-linear precoding modes is configured to use explicit full downlink channel state information.

Another embodiment includes a method that may include receiving, from a network node, an indication of a non-linear precoding mode selected from two non-linear precoding modes. A first of the two non-linear precoding modes is configured to use explicit beamformed channel state information, and a second of the two non-linear precoding modes is configured to use explicit full downlink channel state information. The method may also include performing, by a user equipment, receive procedures according to the selected mode.

Another embodiment includes to an apparatus that may include at least one processor and at least one memory comprising computer program code. The at least one memory and computer program code configured, with the at least one processor, to cause the apparatus at least to receive, from a network node, an indication of a non-linear precoding mode selected from two non-linear precoding modes. A first of the two non-linear precoding modes is configured to use explicit beamformed channel state information, and a second of the two non-linear precoding modes is configured to use explicit full downlink channel state information. The at least one memory and computer program code may be further configured, with the at least one processor, to cause the apparatus at least to perform receive procedures according to the selected mode.

Another embodiment includes an apparatus that may include receiving means for receiving, from a network node, an indication of a non-linear precoding mode selected from two non-linear precoding modes. A first of the two non-linear precoding modes is configured to use explicit beamformed channel state information, and a second of the two non-linear precoding modes is configured to use explicit full downlink channel state information. The apparatus may also include performing means for performing receive procedures according to the selected mode.

Another embodiment includes a non-transitory computer readable medium comprising program instructions stored thereon for performing the steps of receiving, from a network node, an indication of a non-linear precoding mode selected from two non-linear precoding modes, and performing receive procedures according to the selected mode. A first of the two non-linear precoding modes is configured to use explicit beamformed channel state information, and a second of the two non-linear precoding modes is configured to use explicit full downlink channel state information.

BRIEF DESCRIPTION OF THE DRAWINGS

For proper understanding of some example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for non-linear precoding in radio access networks, such as NR, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments described herein may relate to a new radio (NR) multi-user (MU) multiple-input multiple-output (MIMO) communication system. For instance, some example embodiments may be directed to efficient non-linear precoding procedures for performance enhancement in NR MIMO phase II.

Non-linear precoding has been identified as a promising candidate for NR. With full channel station information (CSI) at the transmitter side, a "Dirty-Paper" Coding (DPC) technique that relies on a pre-subtraction of the non-causally known interference can achieve the maximum sum rate of the system and provide the maximum diversity order. Tomlinson-Harashima Precoding (THP) is a simplified and efficient version of DPC, which is less computationally demanding and thus more attractive for practical implementation. Non-linear precoding, such as THP, is able to provide a significantly enhanced system performance as compared to linear precoding, especially for correlated channels where the subspaces of user equipment (UEs) are overlapped.

However, one technical challenge or problem in the implementation of non-linear precoding relates to receive combining. When a UE has multiple antennas and the number of antennas is usually larger than the number of data streams, receive combining at the UE side that maps from antennas to streams is used. Furthermore, the traditional way to construct physical downlink shared channel (PDSCH), i.e., demodulation reference signal (DMRS) together with data using the same precoding, is no longer suitable for non-linear precoding, since non-linear processing at the transmitter leads to a corrupted DMRS and the receiver cannot estimate the channel directly. Accordingly, specific DMRS may be required. Therefore, a solution for how to design receive combining to well fit non-linear precoding according to which kinds of channel state information (CSI), as well as which types of DMRS should be supported, is needed.

Some example embodiments include a non-linear precoding procedure, for example, to further enhance the performance of NR MIMO systems. Certain embodiments may include two non-linear precoding modes. Each of the two non-linear precoding modes may provide different performances based on corresponding different CSI acquisition schemes, according to a UE's capability and channel quality. In one example embodiment, as will be discussed in further detail below, a gNB may indicate the precoding mode and CSI trigger to a UE, in order to allow the UE to carry out the corresponding receive demodulation procedure.

Certain example embodiments may provide two non-linear precoding modes. One of the non-linear precoding modes may utilize explicit beamformed CSI, and the other one of the non-linear precoding modes may utilize explicit full downlink (DL) CSI. In certain example embodiments described herein, the two modes may be referred to as mode 1 and mode 2. The non-linear precoding modes may be distinguished by using different CSI frameworks, as well as the UE reception procedure and whether it is independent of or dependent on the non-linear precoding design. For example, the non-linear precoding mode with explicit beamformed CSI (i.e., mode 1) applies linear combining at UEs, which is independent of non-linear precoding. The enhanced mode (i.e., mode 2) is the non-linear precoding mode that uses explicit full DL CSI to design linear combining at UE, which is dependent on non-linear precoding. Thus, in some example embodiments, a new indication format may be provided to represent the two-mode operation of non-linear precoding, so that a UE is able to carry out corresponding receive procedures for the performance enhancement.

According to some example embodiments, two CSI acquisition procedures may support and be adapted to the two non-linear precoding modes. This may require a specific CSI trigger to a UE, in one example. The specific CSI trigger may be used to coordinate the UE and gNB to carry out the corresponding CSI acquisition schemes.

It is noted that, for existing systems, there are no specific receive demodulation procedures required for UEs. However, for the enhanced non-linear precoding scheme according to certain examples described herein, the UE may perform differently for the defined different non-linear precoding modes, based on its capability and the gNB's indication. The full DL CSI acquisition is also not an implementation issue, but includes certain behavior at the UE side. Thus, in certain embodiments, the switching between different explicit CSI acquisition frameworks may be carried out by the specific trigger.

Figure 1:
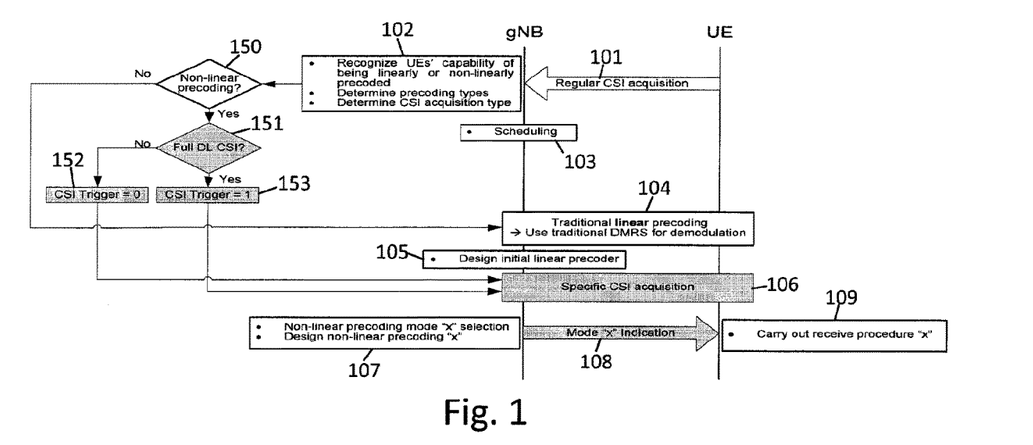
FIG. 1 illustrates an example signaling and/or flow diagram for a non-linear precoding procedure, according to certain example embodiments.

FIG. 1 illustrates an example signaling and/or flow diagram for a non-linear precoding procedure, according to certain example embodiments. As illustrated in the example of FIG. 1, the gNB may acquire explicit CSI feedback from a UE at 101. In certain embodiments, the CSI may be a combination of channel quality indicator (CQI), rank indicator (RI), precoding matrix indicator (PMI), explicit effective/beamformed channel and/or explicit transmit channel covariance, for example.

At 102, the gNB may recognize the UE's capability of being linearly or non-linearly precoded, determine the precoding type based on the UE's capability and determine the CSI acquisition type. In one embodiment, the gNB may determine the precoding type to use by checking, at 155, if the UE is capable of non-linear precoding. If the UE is not capable of non-linear precoding and/or if it is decided to use linear precoding, then the gNB may directly carry out, at 104, traditional linear precoding using traditional demodulation reference signals (DMRS) for demodulation. If it is decided to use non-linear precoding, at 155, the gNB may further check whether to trigger full DL CSI, according to the UE's capability and channel quality. Based on the CSI, the gNB may carry out scheduling of the UE for precoding at 103 and design or calculate the initial linear precoder at 105.

In an embodiment, when full DL CSI is triggered, the CSI trigger may be set to 1, at 153. When full DL CSI is not triggered, the CSI trigger may be set to 0, at 152. Then, specific CSI acquisition may be carried out at 106. As discussed above, according to example embodiments, two different non-linear precoding modes are provided, which each require different CSI frameworks. In the example of FIG. 1, at 107, the gNB may select which of the two non-linear precoding modes to select (e.g., mode 1 or mode 2) and may design non-linear precoding for the selected mode. In an embodiment, mode 1 may refer to the normal non-linear precoding case, where regular explicit beamformed CSI is used (CSI trigger=0). In one embodiment, mode 2 may refer to the enhanced case where explicit full DL CSI is used. Thus, in an example embodiment, the gNB may indicate, at 108, the selected mode to the UE. According to certain embodiments, the mode(s) may be indicated by a specific signaling format, such as in DCI, to inform the UE on the corresponding non-linear precoding methods and assist the UE in carrying out the different receive procedures. Accordingly, at 109, the UE may then carry out a receive procedure according to the indicated non-linear precoding mode.

An example of the relationship between the CSI acquisition framework and the non-linear precoding is depicted in Table 1 below.

TABLE 1

| Indication Format | Mode 1 | Mode 2 |
|---|---|---|
| CSI Framework | CSI Trigger = 0 or 1 | CSI Trigger = 1 |

It should be noted that, while FIG. 1 illustrates signaling between nodes labeled as a gNB and UE, the gNB may also be a base station, node B, eNB, or any other network node capable of providing radio access functionality, and the UE may be a mobile device, IoT device, or any other device capable of communication with a wireless or wired communication network.

Figure 2:
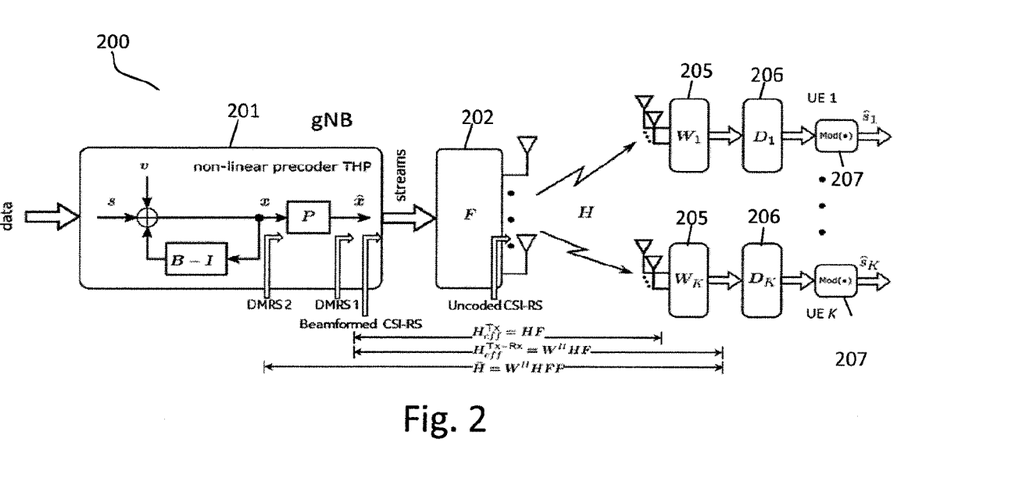
FIG. 2 illustrates a block diagram of a non-linear precoding system, according to an embodiment.

FIG. 2 illustrates a block diagram of a non-linear precoding system 200, according to an embodiment. In one example embodiment, system 200 may be a THP-based non-linear precoding system for MU MIMO. In this example embodiment, there may be K UEs in the system and each UE may have $M_{R_k}$ antennas. In addition, in one example, there may be $M_T$ antennas at the gNB and in total $r=\Sigma_{k=1}^{K}r_k$ streams, where the gNB may transmit $r_k$ streams to the UE k. According to one embodiment, precoding at the gNB side may include a linear beamformer 202, F=[$F_1$, $F_2$, ..., $F_K$]$\in \mathbb{C}^{M_T \times r}$ and a non-linear THP precoder 201 to suppress inter-stream and inter-user interference. At the UE side, the receive processing may include a linear combiner 205, $W_k \in \mathbb{C}^{M_{R_k} \times r_k}$, a weighting process 206, $D_k \in \mathbb{C}^{r \times r_k}$, and a modulo operation 207, Mod (·), before the demodulation and decoding. In one example, the channel H=[$H_1^T$, $H_2^T$, ..., $H_K^T$]$^T \in \mathbb{C}^{M_R \times M_T}$ is the full CSI, where $M_R = \Sigma_{k=1}^{K} M_{R_k}$ is the total number of receive antennas from all UEs.

Figure 3:
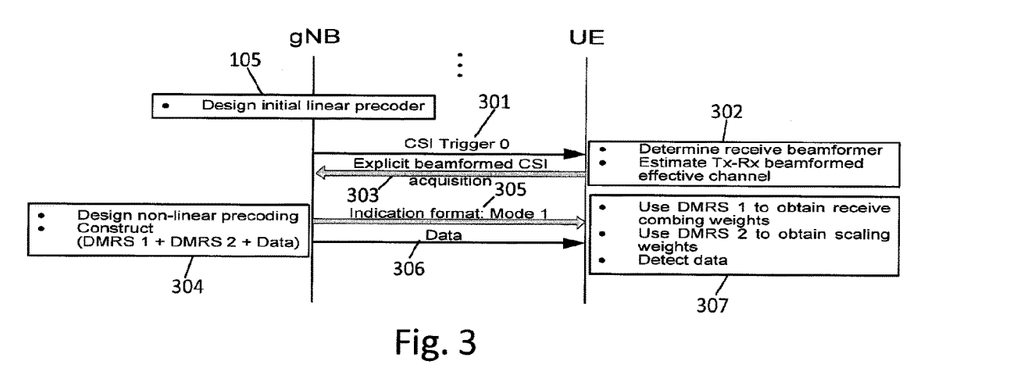
FIG. 3 illustrates an example signaling diagram for a procedure of non-linear precoding mode 1 at the main stage, according to an example embodiment.

FIG. 3 illustrates an example signaling diagram for a procedure of non-linear precoding mode 1 at the main stage, according to an example embodiment. As illustrated in the example of FIG. 3, the gNB may design an initial linear precoder at 105, as also illustrated in FIG. 1 discussed above. The gNB may indicate CSI trigger 0 to the UE, at 301. The UE may then determine the receive beamformer and estimate the Tx-Rx beamformed effective channel, at 302. The gNB may then acquire explicit beamformed CSI from the UE, at 303. The gNB may, at 304, design the non-linear precoder and construct DMRS 1, DMRS 2, and data. At 305, the gNB may indicate mode 1 to the UE, at 305, and may transmit the DMRS 1, DMRS 2 and/or data, at 306. As mentioned above, the indication of the mode may use a specific signaling format in DCI, for example. After receiving an indication of the mode and data, the UE may, at 307, use DMRS 1 to obtain receive combining weights, use DMRS 2 to obtain scaling weights, and detect the data.

As mentioned above, mode 1 may refer to normal non-linear precoding, which corresponds to the case when the receive linear combiner is independent of the THP non-linear percoding design. According to an embodiment, in order to perform THP non-linear precoding, the Tx-Rx effective/beamformed channel, $H_{eff}^{Tx-Rx} \in \mathbb{C}^{r \times r}$, should be obtained as follows:

$$H_{eff}^{Tx-Rx} = W^H HF = \begin{bmatrix} W_1^H H_1 F_1 & W_1^H H_1 F_2 & \cdots & W_1^H H_1 F_K \\ W_2^H H_2 F_1 & W_2^H H_2 F_2 & \cdots & W_2^H H_2 F_K \\ \vdots & \vdots & \ddots & \vdots \\ W_K^H H_K F_1 & W_K H_K F_2 & \cdots & W_K H_K F_K \end{bmatrix}. \quad (1)$$

In certain embodiments, the gNB may send downlink beamformed CSI-RS to scheduled UEs. Each UE may estimate the Tx effective/beamformed channel $H_{k,eff}^{Tx}=H_kF_k\in\mathbb{C}^{M_{R_k}\times r_k}$ and evaluate its receive combining $W_k$ assuming, for example, Maximal Ratio Combining (MRC) at the receiver by:

$$W_k = \frac{H_kF_k}{\|H_kF_k\|_F}. \quad (2)$$

Based on the CSI $H_{eff}^{Tx-Rx}$, the gNB may design the THP based non-linear precoding. The linear presentation model of the THP non-linear precoding is shown in the block 201 of FIG. 2. In an embodiment, the modulo operation inside the feedback loop may be removed and a vector perturbation v may be equivalently added to the original data $s\in\mathbb{C}^r$ before the loop, where each element $v_i$ is $v_i\in\{2\sqrt{M}\cdot(v_I+jv_Q)|v_I,v_Q\in\mathbb{Z}\}$ for M-ary QAM modulated signals. By calculating an LQ decomposition on the channel $H_{eff}^{Tx-Rx}$, the following is obtained:

$$H_{eff}^{Tx-Rx}=LQ \quad (3)$$

where L is a lower triangular matrix and Q is a unitary matrix. The feedforward and feedback filters for the THP algorithm can be obtained as:

$$P=Q^H \quad (4)$$

and $$B=DL \quad (5)$$
$$D=\text{diag}\{L^{-1}(1,1),\ldots,L^{-1}(r,r)\}$$

respectively, where L(i,i) is the i-th diagonal element of the matrix L. Then the signal output of the loop can be written as $x\in\mathbb{C}^r$, where each element is expressed by:

$$x_i = s_i + v_i - \sum_{l=1}^{i-1} B(i,l)x_l, \quad (6)$$
$$i=1,\ldots,r$$

It can be seen that the THP precoding includes a feedback loop depending on B and a linear feedforward filter P. The non-linear precoded equivalent channel is defined as $\bar{H}=W^HHFP$. For demodulation, a UE may firstly measure the Tx effective/beamformed channel $H_{k,eff}^{Tx}=H_kF_k$ via DMRS 1 and design the linear combining $W_k$. Then, the UE may estimate its non-linearly precoded equivalent channel $\bar{H}_k=H_{k,eff}^{Tx-Rx}P_k$ via DMRS 2 and design the weighting $D_k$. The whole equivalent channel $\bar{H}=H_{eff}^{Tx-Rx}P$ is a lower triangular matrix as the recovery of L. As a result, the weighting matrix can be obtained by $D=\text{diag}\{D_1,\ldots,D_K\}=\text{diag}\{\bar{H}^{-1}(1,1),\ldots,\bar{H}^{-1}(r,r)\}$, where $\bar{H}(i,i)$ takes the diagonal element of the lower-triangular matrix $\bar{H}$.

Figure 4:
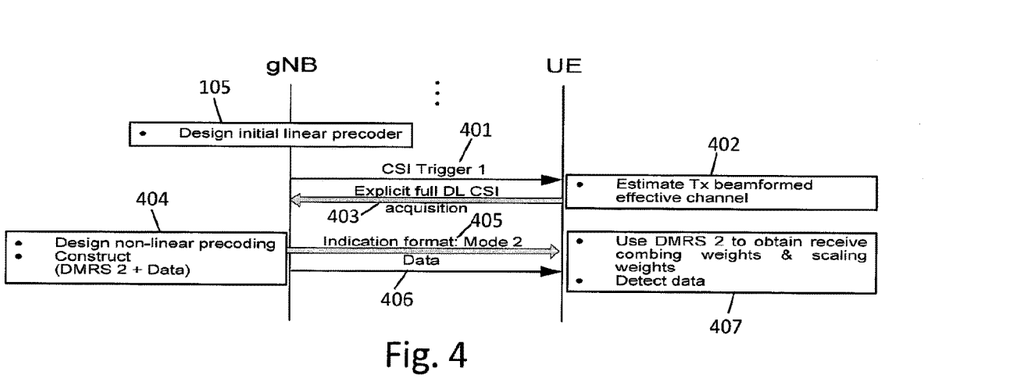
FIG. 4 illustrates an example signaling diagram for a procedure of non-linear precoding mode 2 at the main stage, according to an example embodiment.

FIG. 4 illustrates an example signaling diagram for a procedure of non-linear precoding mode 2 at the main stage, according to an example embodiment. As illustrated in the example of FIG. 4, the gNB may design an initial linear precoder at 105, as also illustrated in FIG. 1 discussed above. The gNB may indicate CSI trigger 1 to the UE, at 401. The UE may then estimate the Tx beamformed effective channel, at 402. The gNB may then acquire explicit full DL CSI from the UE, at 403. The gNB may, at 404, design the non-linear precoder and construct DMRS 2 and data. At 405, the gNB may indicate mode 2 to the UE, at 405, and may transmit the DMRS 2 and/or data, at 406. As mentioned above, the indication of the mode may use a specific signaling format in DCI, for example. After receiving an indication of the mode and data, the UE may, at 407, use DMRS 2 to obtain receive combining weights and scaling weights, and detect the data.

As mentioned above, mode 2 may refer to an enhanced non-linear precoding procedure and may include the case where the linear receive combiner is designed together with THP, i.e., dependent on THP. In this case, according to an embodiment, the full DL CSI is obtained for non-linear precoding design. The full DL CSI may be named as Tx effective/beamformed channel $H_{eff}^{Tx}=HF\in\mathbb{C}^{M_R\times r}$. In certain embodiments, the block diagonal Geometric Mean Decomposition (GMD) based THP may be applied, i.e., by constructing the TX-RX effective/beamformed channel $H_{eff}^{Tx-Rx}$ into a lower triangular structure according to the following:

$$H_{eff}^{Tx-Rx}=W^HH_{eff}^{Tx}P=L, \quad (7)$$

In an embodiment, the block diagonal GMD-THP algorithm may be implemented recursively. The related matrices can be reformulated as:

$$W = \begin{bmatrix} W_1 & 0 \\ 0 & \hat{W}_2 \end{bmatrix} \quad (8)$$

$$H_{eff}^{Tx} = \begin{bmatrix} H_{1,eff}^{Tx} \\ \hat{H}_{2,eff}^{Tx} \end{bmatrix}$$

$$P = [P_1, \hat{P}_2]$$

$$L = \begin{bmatrix} L_1 & 0 \\ \Xi_1 & \hat{L}_2 \end{bmatrix},$$

where $\hat{W}_k, \hat{H}_{k,eff}^{Tx}, \hat{P}_k, \hat{L}_k$ correspond to the receive combining, Tx effective/beamformed channel, feedforward filter, and equivalent lower-triangular channel for users from k to K. For the UE 1, the receive beamforming and feedforward filter may be obtained by applying GMD algorithm to construct the lower triangular matrix $W_1^HH_{1,eff}^{Tx}P_1=L_1$, where $W_1$ and $P_1$ contain orthogonal columns. Additionally, to make sure that UE 1 does not interfere with the rest of the scheduled UEs, i.e., $W_1^HH_{1,eff}^{Tx}\hat{P}_2=0$, an embodiment projects $\hat{H}_{2,eff}^{Tx}$ by multiplying the projection matrix $\hat{H}_{2,eff}^{Tx}$ and obtains another lower-triangular equivalent channel $\hat{W}_2^H\hat{H}_{2,eff}^{Tx}(I_r-P_1P_1^H)\hat{P}_2=\hat{L}_2$, which can be similarly solved by GMD. The total lower-triangular equivalent channel matrix L in Equation 8 may be constructed by calculating $\Xi_1$ as $\Xi_1=\hat{W}_2^H\hat{H}_{2,eff}^{Tx}P_1$. Then, further decomposition of the matrix $\hat{L}_2$ may be carried out in the same manner if more than two UEs exist.

For demodulation of GMD-THP, the k-th UE may apply DMRS 2 to estimate the CSI $\check{H}_k=H_{k,eff}^{Tx}P_k\in\mathbb{C}^{M_{R_k}\times r_k}$. Since a lower triangular matrix is constructed by $W_k^HH_{k,eff}^{Tx}P_k=L_k$, assuming $W_k$ is quasi-unitary and the diagonal entries of $L_k$ are positive according to the previous design, the following may be obtained:

$$\check{H}_k=H_{k,eff}^{Tx}P_k=W_kL_k. \quad (9)$$

Applying QL decomposition on the measured CSI $\check{H}_k$ as:

$$\check{H}_k=\check{Q}_k\check{L}_k \quad (10)$$

and obtain the receive combiner and scaling weights as:

$$W_k=\check{Q}_k(:,M_{R_k}-r_k+1:M_{R_k})$$

$$L_k=\check{L}_k(M_{R_k}-r_k+1:M_{R_k},:)$$

$$G_k=\text{diag}\{L_k\}^{-1}\odot\text{sign}\{\text{diag}\{L_k\}\}\triangleq\text{diag}\{L_k\}^{-1}\odot\alpha, \quad (11)$$

where ⊙ denotes the Hadamard product and the receive combining weights may also be corrected by a sign ambiguity as $W_k(j,i)=W_k(j,i)\cdot\alpha(i)$, $\forall j$ due to the positive diagonal elements of $L_k$.

Figure 5A:
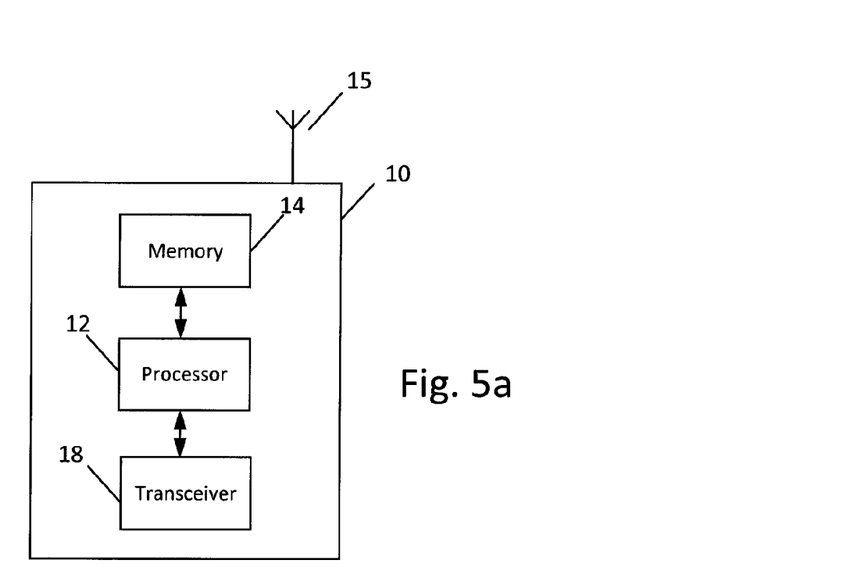
FIG. 5a illustrates an example block diagram of an apparatus, according to one embodiment.

FIG. 5a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow, signaling or block diagrams illustrated in FIGS. 1-4. For example, in certain embodiments, apparatus 10 may be controlled by memory 14 and processor 12 to perform one or more of the steps performed by the gNB illustrated in FIGS. 1-4. In certain embodiments, apparatus 10 may be configured to perform an efficient non-linear precoding procedure that may include utilizing two non-linear precoding modes that each provide different performance based on corresponding different CSI acquisition schemes.

For instance, in some embodiments, apparatus 10 may be controlled by memory 14 and processor 12 to acquire regular CSI from one or more UE(s). In an embodiment, apparatus 10 may then be controlled by memory 14 and processor 12 to determine a precoding type to use, based on a capability of the UE(s) to be linearly precoded and/or non-linearly precoded. According to certain example embodiments, apparatus 10 may also be controlled by memory 14 and processor 12 to determine a CSI acquisition type. For example, the CSI acquisition type may be explicit beamformed CSI or explicit full DL CSI. Thus, according to an embodiment, the determination of the CSI acquisition type may include determining whether to trigger full DL CSI according to the capability of the UE(s) and the channel quality. In one embodiment, apparatus 10 may be controlled by memory 14 and processor 12 to transmit a CSI trigger indication to the UE(s). For instance, for mode 1, the CSI trigger may be set to 0 or 1 and, for mode 2, the CSI trigger may be set to 1, as shown in Table 1 above.

According to certain example embodiments, when it is determined that the UE(s) is capable of being non-linearly precoded, apparatus 10 may be controlled by memory 14 and processor 12 to select or determine one of the two non-linear precoding modes (i.e., mode 1 or mode 2), and to indicate the determined non-linear precoding mode to the UE(s). In an embodiment, a first of the two non-linear precoding modes (mode 1) is configured to use explicit beamformed channel state information, and a second of the two non-linear precoding modes (mode 2) is configured to use explicit full downlink channel state information. In addition, in certain embodiments, the first of the two non-linear precoding modes (mode 1) may be configured to use linear receive combining at the UE(s) that is designed independent of non-linear precoding, and the second of the two non-linear precoding modes (mode 2) may be configured to use linear receive combining at the UE(s) that is designed dependent on non-linear precoding. In one embodiment, the indication of the determined non-linear precoding mode may further include an indication of a type of receive combining that should be applied at the UE(s).

In some embodiments, apparatus 10 may be controlled by memory 14 and processor 12 to acquire specific CSI from the UE(s). For example, in certain example embodiments, when the selected mode is the first mode configured to use explicit beamformed CSI (mode 1), the specific CSI acquired from the UE(s) is explicit beamformed CSI. In other example embodiments, when the selected mode is the second mode configured to use explicit full downlink CSI, the specific CSI acquired from the UE(s) is full DL CSI.

According to certain embodiments, apparatus 10 may be controlled by memory 14 and processor 12 to schedule the UE(s) for non-linear precoding, and to calculate a non-linear precoder for the UE(s) according to the selected mode. In some embodiments, apparatus 10 may be controlled by memory 14 and processor 12 to construct DMRS and data, and to transmit the constructed DMRS and the data to the UE(s) for use in receive processing. According to certain embodiments, when the selected mode is the first mode configured to use the linear receive combining at the UE(s) that is designed independent of non-linear precoding, DMRS 1 and DMRS 2 are multiplexed with the data, and, when the selected mode is the second mode configured to use the linear receive combining at the UE(s) that is designed dependent on non-linear precoding, only DMRS 2 is multiplexed with the data.

Figure 5B:
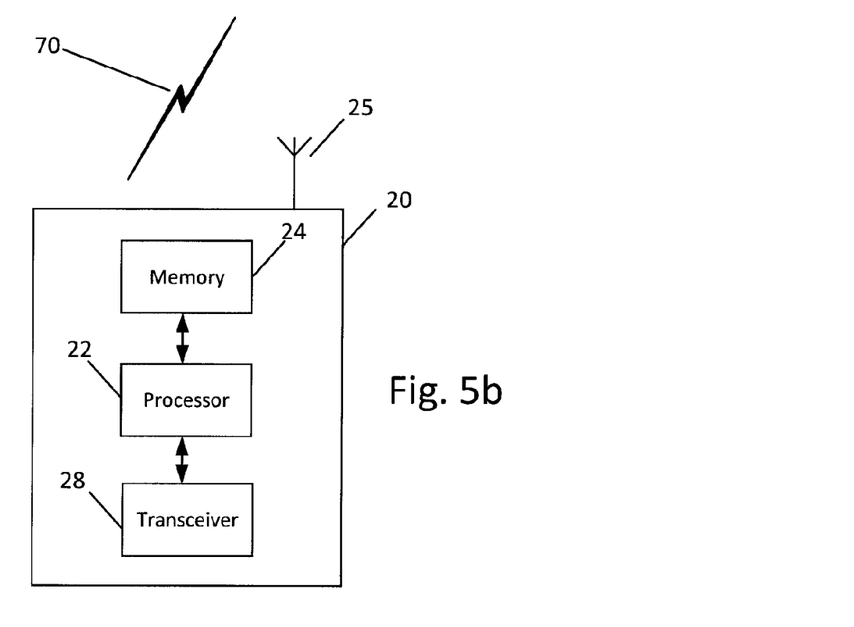
FIG. 5b illustrates an example block diagram of an apparatus, according to another embodiment.

FIG. 5b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein, such as the flow, signaling or block diagrams illustrated in FIGS. 1-4.

According to some embodiments, apparatus 20 may be controlled by memory 24 and processor 22 to receive an indication of a selected non-linear precoding mode from a network node. The first of the two non-linear precoding modes (mode 1) is configured to use explicit beamformed channel state information, and the second of the two non-linear precoding modes (mode 2) is configured to use explicit full downlink channel state information. In certain embodiments, apparatus 20 may be controlled by memory 24 and processor 22 to also receive a CSI trigger indication from the network node, and depending on the CSI trigger indication, to perform a determination of a receive beamformer and/or estimating Tx-Rx beamformed effective channel. In one embodiment, apparatus 20 may also be controlled by memory 24 and processor 22 to transmit explicit CSI to the network node. The explicit CSI may be explicit beamformed CSI or explicit full DL CSI.

In an embodiment, apparatus 20 may be further controlled by memory 24 and processor 22 to perform receive procedures according to the selected mode. For example, when the selected mode is the first mode configured to use explicit beamformed CSI, apparatus 20 may be further controlled by memory 24 and processor 22 to use DMRS 1 to obtain receive combining weights, to use DMRS 2 to obtain scaling weights, and to detect data. When the selected mode is the second mode configured to use explicit full DL CSI, apparatus 20 may be further controlled by memory 24 and processor 22 to use DMRS 2 to obtain the receive combining weights and the scaling weights, and to detect data.

Figure 6A:
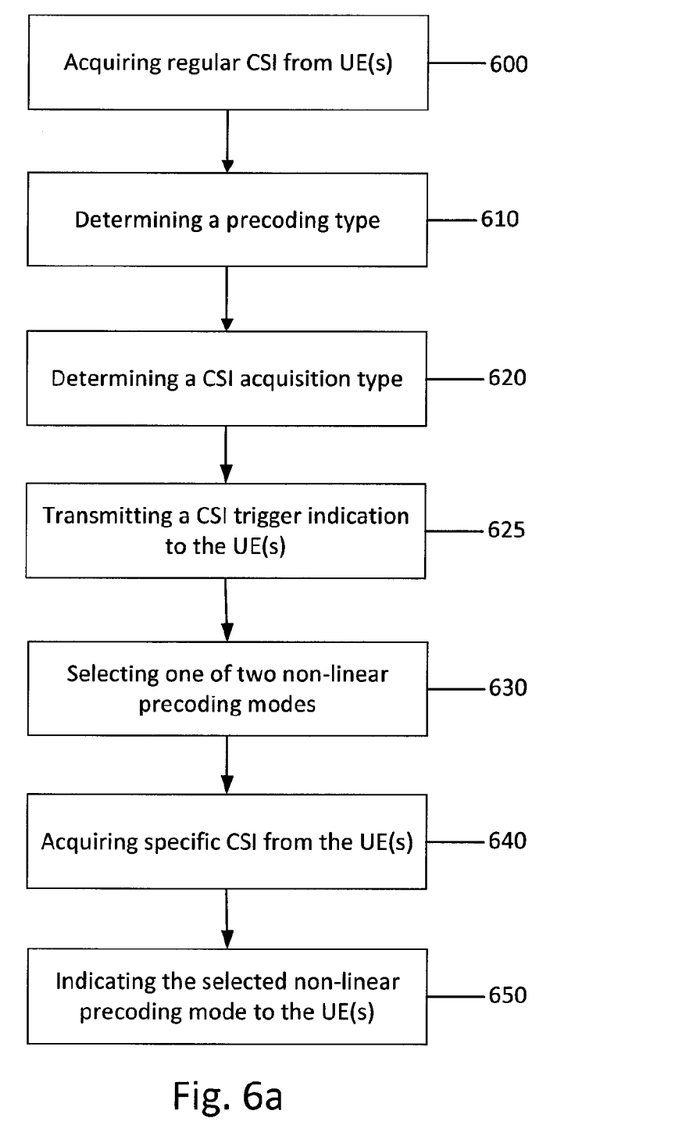
FIG. 6a illustrates an example flow diagram of a method, according to one embodiment.

FIG. 6a illustrates an example flow diagram of a method for non-linear precoding, according to one embodiment. In certain embodiments, the flow diagram of FIG. 6a may be performed by a network node, such as a base station, node B, eNB, gNB, or any other access node. As illustrated in the example of FIG. 6a, the method may include, at 600, acquiring regular CSI from one or more UE(s). In an embodiment, the method may also include, at 610, determining a precoding type to use, based on a capability of the UE(s) to be linearly precoded and/or non-linearly precoded. According to certain example embodiments, the method may also include, at 620, determining a CSI acquisition type. For example, the CSI acquisition type may be explicit beamformed CSI or explicit full DL CSI. Thus, according to an embodiment, the determining 620 of the CSI acquisition type may include determining whether to trigger full DL CSI according to the capability of the UE(s) and the channel quality. In one embodiment, the method may include, at 625, transmitting a CSI trigger indication to the UE(s). For instance, for mode 1, the CSI trigger may be set to 0 or 1 and, for mode 2, the CSI trigger may be set to 1, as shown in Table 1 above.

According to certain example embodiments, when it is determined that the UE(s) is capable of being non-linearly precoded, the method may include, at 630, selecting or determining one of two non-linear precoding modes (i.e., mode 1 or mode 2) to use. In an embodiment, a first of the two non-linear precoding modes (mode 1) is configured to use explicit beamformed channel state information, and a second of the two non-linear precoding modes (mode 2) is configured to use explicit full downlink channel state information.

In some embodiments, the method may also include, at 640, acquiring specific CSI from the UE(s). For example, in certain example embodiments, when the selected mode is the first mode configured to use explicit beamformed CSI (mode 1), the specific CSI acquired from the UE(s) is explicit beamformed CSI. In other example embodiments, when the selected mode is the second mode configured to use explicit full downlink CSI, the specific CSI acquired from the UE(s) is full DL CSI. The method may also include, at 650, indicating the determined non-linear precoding mode to the UE(s).

In addition, in certain embodiments, the first of the two non-linear precoding modes (mode 1) may be configured to use linear receive combining at the UE(s) that is designed independent of non-linear precoding, and the second of the two non-linear precoding modes (mode 2) may be configured to use linear receive combining at the UE(s) that is designed dependent on non-linear precoding. In one embodiment, the indicating 650 of the determined non-linear precoding mode may further include indicating a type of receive combining that should be applied at the UE(s).

According to certain embodiments, the method may also include scheduling the UE(s) for non-linear precoding, and calculating a non-linear precoder for the UE(s) according to the selected mode. In some embodiments, the method may also include constructing DMRS and data, and transmitting the constructed DMRS and the data to the UE(s) for use in receive processing. According to certain embodiments, when the selected mode is the first mode configured to use the linear receive combining at the UE(s) that is designed independent of non-linear precoding, DMRS 1 and DMRS 2 are multiplexed with the data, and, when the selected mode is the second mode configured to use the linear receive combining at the UE(s) that is designed dependent on non-linear precoding, only DMRS 2 is multiplexed with the data.

Figure 6B:
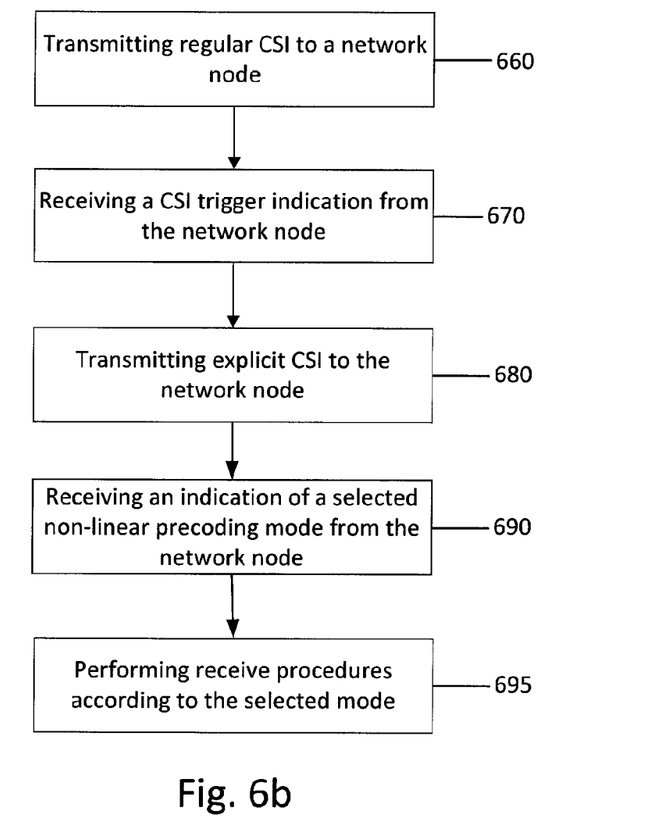
FIG. 6b illustrates an example flow diagram of a method, according to another embodiment.

FIG. 6b illustrates an example flow diagram of a method for non-linear precoding, according to one embodiment. In certain embodiments, the flow diagram of FIG. 6b may be performed, for example, by a UE, mobile station, mobile equipment, IoT device, or the like. As illustrated in the example of FIG. 6b, the method may include, at 650, transmitting regular CSI to a network node. The method may also include, at 670, receiving a CSI trigger indication from the network node, and depending on the CSI trigger indication, determining a receive beamformer and/or estimating Tx-Rx beamformed effective channel. In one embodiment, the method may then include, at 680, transmitting explicit CSI to the network node. The explicit CSI may be explicit beamformed CSI or explicit full DL CSI. In certain embodiments, the method may include, at 690, receiving an indication of a selected non-linear precoding mode from the network node. The first of the two non-linear precoding modes (mode 1) is configured to use explicit beamformed channel state information, and the second of the two non-linear precoding modes (mode 2) is configured to use explicit full downlink channel state information.

In an embodiment, the method of FIG. 6b may further include, at 695, performing receive procedures according to the selected mode. For example, when the selected mode is the first mode configured to use explicit beamformed CSI, the performing 695 may include using DMRS 1 to obtain receive combining weights, using DMRS 2 to obtain scaling weights, and detecting data. When the selected mode is the second mode configured to use explicit full DL CSI, the performing 695 may include using DMRS 2 to obtain the receive combining weights and the scaling weights, and detecting data.

Therefore, certain example embodiments provide several technical improvements, enhancements, and/or advantages. Various example embodiments provide non-linear precoding procedures resulting in performance enhancement in NR. For example, as a result of certain embodiments, network throughput and UE throughput performance are improved. Example embodiments can dynamically switch to different precoding modes according to a UE's capability and channel quality. Certain embodiments provide high flexibility to include traditional linear precoding, as well as non-linear precoding with enhancement, which is based on current standardization and can be easily extended to the current NR MIMO systems. The enhanced mode provided by example embodiments leads to a significant performance improvement compared to current systems. In fact, simulation results have demonstrated that both cell throughput and UE throughput performance are significantly improved. Indeed, simulations have shown that the non-linear precoding scheme mode 1 according to example embodiments outperforms its linear counterpart, and that the non-linear precoding scheme mode 2 according to example embodiments results in a performance enhancement as compared to mode 1.

As such, example embodiments can improve performance, latency, and/or throughput of networks and network nodes including, for example, access points, base stations/eNBs/gNBs, and mobile devices or UEs. Accordingly, the use of certain example embodiments result in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that example embodiments as discussed above may be practiced with steps in a different order, and/or with hardware elements in configurations which are different than those which are disclosed. Therefore, although some example embodiments have been described, it would be apparent to those of skill in the art that certain modifications, variations, and alternative constructions would be apparent, while remaining within the spirit and scope of certain embodiments. In order to determine the metes and bounds of example embodiments, therefore, reference should be made to the appended claims.

What is claimed is:

1. An apparatus, comprising:
   at least one processor; and
   at least one memory comprising computer program code,
   the at least one memory and computer program code configured, with the at least one processor, to cause the apparatus at least to
   determining one of two non-linear precoding modes for at least one user equipment that is capable of being non-linearly precoded; and
   indicate the determined non-linear precoding mode to the at least one user equipment,
   wherein a first of the two non-linear precoding modes is configured to use explicit beamformed channel state information, and a second of the two non-linear precoding modes is configured to use explicit full downlink channel state information.

2. The apparatus according to claim 1, wherein the first of the two non-linear precoding modes is configured to use linear receive combining at the at least one user equipment that is designed independent of non-linear precoding, and wherein the second of the two non-linear precoding modes is configured to use linear receive combining at the at least one user equipment that is designed dependent on non-linear precoding.

3. The apparatus according to claim 2, wherein the at least one memory and computer program code are further configured, with the at least one processor, to cause the apparatus at least to:
   construct and transmit demodulation reference signals and data,
   wherein, when the selected mode is said first mode configured to use the linear receive combining at the at least one user equipment that is designed independent of non-linear precoding, demodulation reference signal 1 and demodulation reference signal 2 are multiplexed with the data, and
   wherein, when the selected mode is said second mode configured to use the linear receive combining at the at least one user equipment that is designed dependent on non-linear precoding, only demodulation reference signal 2 is multiplexed with the data.

4. The apparatus according to claim 1, wherein the at least one memory and computer program code are further configured, with the at least one processor, to cause the apparatus at least to:
   determine a channel state information acquisition type; and
   transmit a channel state information trigger indication to the at least one user equipment.

5. The apparatus according to claim 4, wherein the determining of the channel station information acquisition type comprises determining whether to trigger full downlink channel state information according to the capability of the at least one user equipment and channel quality.

6. The apparatus according to claim 1, wherein the at least one memory and computer program code are further configured, with the at least one processor, to cause the apparatus at least to:
   acquire specific channel state information from the at least one user equipment,
   wherein, when the determined mode is said first mode configured to use explicit beamformed channel state information, the acquiring of the specific channel state information comprises acquiring explicit beamformed channel state information, and
   wherein, when the determined mode is said second mode configured to use explicit full downlink channel state information, the acquiring of the specific channel state information comprises acquiring full downlink channel state information.

7. The apparatus according to claim 1, wherein the at least one memory and computer program code are further configured, with the at least one processor, to cause the apparatus at least to:
   schedule the at least one user equipment for non-linear precoding; and
   calculate a non-linear precoder for the at least one user equipment according to the determined mode.

8. The apparatus according to claim 1, wherein the at least one memory and computer program code are further configured, with the at least one processor, to cause the apparatus at least to transmit an indication of a type of receive combining that should be applied at the at least one user equipment.

9. A method, comprising:
   receiving, from a network node, an indication of a non-linear precoding mode selected from two non-linear precoding modes, wherein a first of the two non-linear precoding modes is configured to use explicit beamformed channel state information, and a second of the two non-linear precoding modes is configured to use explicit full downlink channel state information; and performing, by a user equipment, receive procedures according to the selected mode.

10. The method according to claim 9,
wherein, when the indication indicates the first mode, the performing of the receive procedures comprises performing linear receive combining designed independent of non-linear precoding based on the use of the explicit beamformed channel state information, and
wherein, when the indication indicates the second mode, the performing of the receive procedures comprises performing linear receive combining designed dependent on non-linear precoding based on the use of full downlink channel state information.

11. The method according to claim 9, further comprising:
receiving a channel station information trigger indication from the network node; and
depending on the channel station information trigger indication, performing at least one of determining a receive beamformer or estimating transmit-receive beamformed effective channel.

12. The method according to claim 9, further comprising:
transmitting explicit channel state information to the network node,
wherein the explicit channel state information comprises one of explicit beamformed channel state information or explicit full downlink channel state information.

13. The method according to claim 9, wherein:
when the selected mode is the first mode configured to use explicit beamformed channel state information, the performing of the receive procedures comprises using demodulation reference signal 1 to obtain receive combining weights, using demodulation reference signal 2 to obtain scaling weights, and detecting data; and
when the selected mode is the second mode configured to use explicit full downlink channel state information, the performing of the receive procedures comprises using the demodulation reference signal 2 to obtain the receive combining weights and the scaling weights, and detecting data.

14. An apparatus, comprising:
at least one processor; and
at least one memory comprising computer program code,
the at least one memory and computer program code configured, with the at least one processor, to cause the apparatus at least to
receive an indication of a non-linear precoding mode selected from two non-linear precoding modes,
wherein a first of the two non-linear precoding modes is configured to use explicit beamformed channel state information, and a second of the two non-linear precoding modes is configured to use explicit full downlink channel state information; and
perform receive procedures according to the selected mode.

15. The apparatus according to claim 14,
wherein, when the indication indicates the first mode, the performing of the receive procedures comprises performing linear receive combining designed independent of non-linear precoding based on the use of the explicit beamformed channel state information, and
wherein, when the indication indicates the second mode, the performing of the receive procedures comprises performing linear receive combining designed dependent on non-linear precoding based on the use of full downlink channel state information.

16. The apparatus according to claim 14, wherein the at least one memory and computer program code are further configured, with the at least one processor, to cause the apparatus at least to:
receive a channel station information trigger indication from the network node; and
depending on the channel station information trigger indication, perform at least one of determining a receive beamformer or estimating transmit-receive beamformed effective channel.

17. The apparatus according to claim 14, wherein the at least one memory and computer program code are further configured, with the at least one processor, to cause the apparatus at least to:
transmit explicit channel state information to the network node,
wherein the explicit channel state information comprises one of explicit beamformed channel state information or explicit full downlink channel state information.

18. The apparatus according to claim 14, wherein the at least one memory and computer program code are further configured, with the at least one processor, to cause the apparatus at least to:
when the selected mode is the first mode configured to use explicit beamformed channel state information, use demodulation reference signal 1 to obtain receive combining weights, use demodulation reference signal 2 to obtain scaling weights, and detect data; and
when the selected mode is the second mode configured to use explicit full downlink channel state information, use the demodulation reference signal 2 to obtain the receive combining weights and the scaling weights, and detect the data.

* * * * *